March 28, 1944. T. KNOX ET AL 2,344,945
MEANS FOR PROVIDING DRAG IN AIRCRAFT
Filed July 29, 1942 2 Sheets-Sheet 1
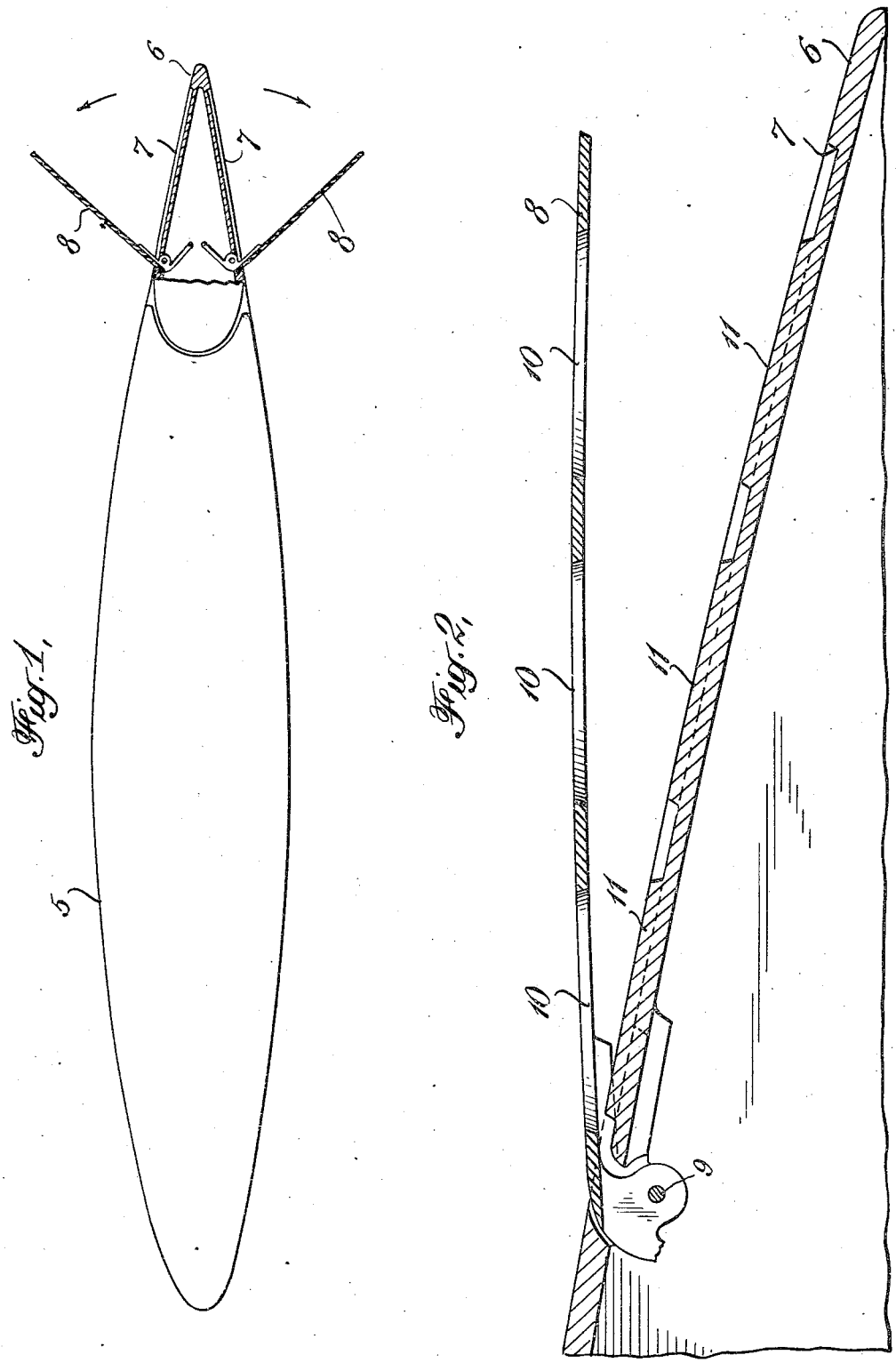
INVENTORS
Thomas Knox and
William I. Stieglitz
BY
Pennie Davis Marvin & Edmonds
ATTORNEYS

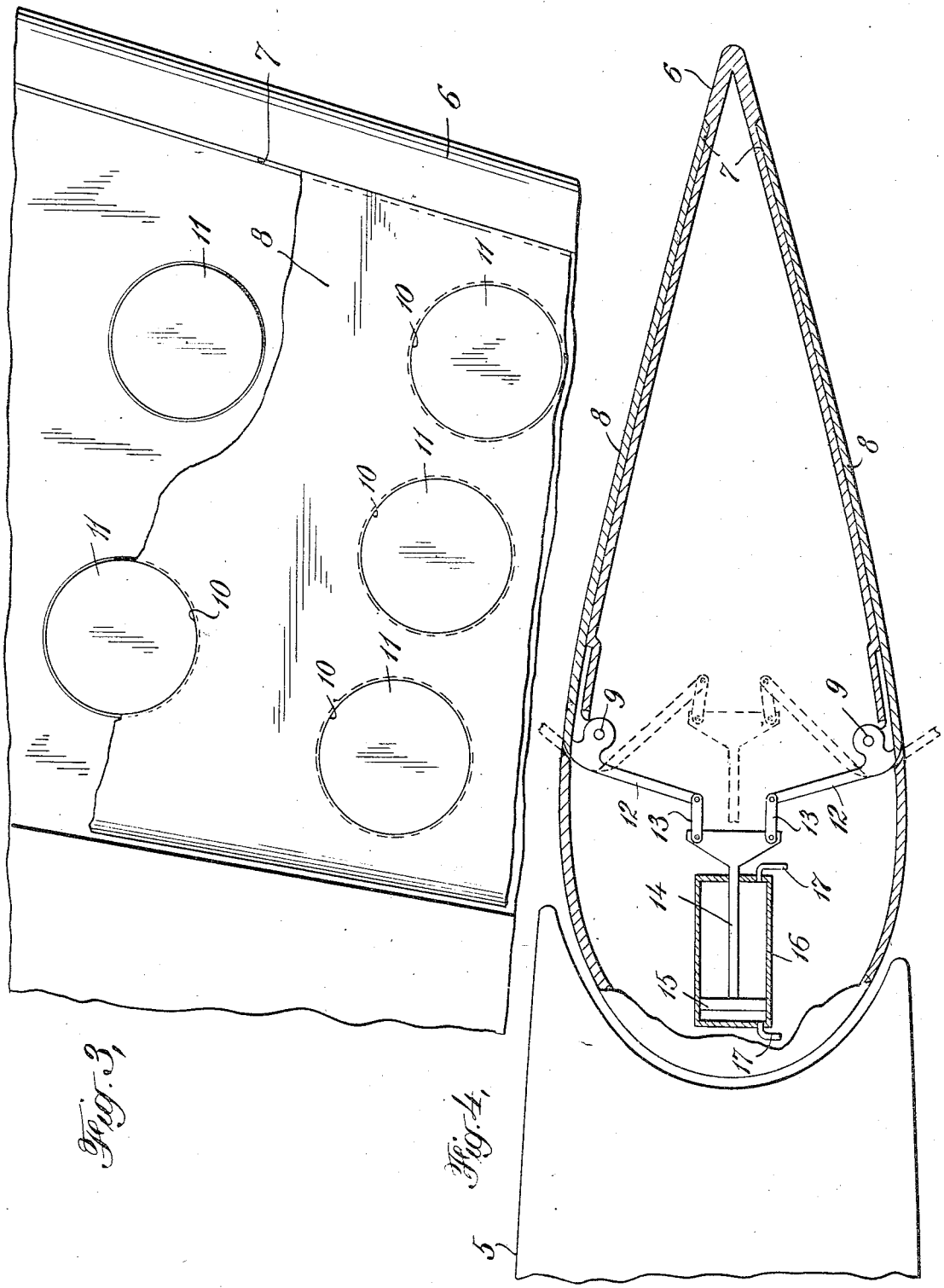

Patented Mar. 28, 1944

2,344,945

UNITED STATES PATENT OFFICE 2,344,945

MEANS FOR PROVIDING DRAG IN AIRCRAFT

Thomas Knox, Bristol, and William I. Stieglitz, Morrisville, Pa., assignors, by mesne assignments, to Reconstruction Finance Corporation Application July 29, 1942, Serial No. 452,674

1 Claim. (Cl. 244—42)

This invention relates to aircraft and particularly to auxiliary flaps adapted to be adjusted in flight to afford additional drag, and thereby to decrease the speed of the aircraft in a dive or to permit rapid deceleration in level flight.

In modern aircraft, it is usual to employ movable flaps on the trailing edge of the wings, inboard of the ailerons. These landing flaps are set by the operator at the desired angle when the aircraft is about to land, to assist in bringing it into proper position for landing and to provide additional lift and drag in the landing operation. The landing flaps when set in angular relation to the wings affect the trim of the aircraft. Such flaps when partially deflected may be used to reduce the take-off run of heavily loaded aircraft by providing a substantial increase in lift with a relatively small increase in drag.

When an aircraft is executing a diving maneuver as in dive bombing, it is frequently desirable to reduce velocity without affecting trim. Likewise if a fighting aircraft approaches another while traveling too rapidly, prompt reduction of speed without affecting alignment of gun sights is essential. The desired braking effect cannot be accomplished by operation of the landing flaps.

It is the object of the present invention to provide auxiliary and independently operable flaps supported on the landing flaps and adapted to be moved simultaneously to angular positions with respect to the landing flaps to afford the desired drag or braking effect without affecting the trim of the aircraft.

Another object of the invention is the provision of means affording additional drag which performs the desired function without setting up undesirable eddy currents and thereby causing erratic operation.

Another object of the invention is the provision of means affording the desired drag which, when not in use, are so disposed as not to introduce unnecessary and detrimental drag in the operation of the aircraft.

Other objects and advantages of the invention will be apparent as it is better understood by reference to the following specification and accompanying drawings, in which Fig. 1 is a transverse section through a wing and flap with the auxiliary flaps mounted thereon;

Fig. 2 is an enlarged sectional view illustrating one of the auxiliary flaps in relation to the main flap;

Fig. 3 is an enlarged plan view of a section of the main flap and one of the auxiliary flaps; and Fig. 4 is a diagrammatic sectional view illustrating the operating means for the auxiliary flaps.

In describing the invention, the auxiliary flaps are considered as accessories to landing flaps which are pivotally secured to the wings of the plane. Referring to the drawings, 5 indicates a wing of any suitable construction having a landing flap 6 pivotally connected at the trailing edge thereof. The details of the landing flap and its connection with the wing structure form no part of the present invention, such structures being common in the art.

The landing flap is provided with recesses 7 on the opposite faces thereof, and the auxiliary flaps 8 are pivoted at 9 and normally rest in the recesses so as to afford a streamlined outer surface on the landing flap. The auxiliary flaps 8 are designed to be moved to the position indicated in full lines in Fig. 1 by the operator of the plane when it is necessary or desirable to retard the speed of the plane.

To avoid the production of undesirable eddy currents, the auxiliary flaps 8 may be provided with a plurality of relatively large openings 10, distributed over the entire surface of each of the auxiliary flaps. Where such openings are provided, they would normally interrupt the surface when the auxiliary flaps are in closed position, that is to say disposed in the recesses in the landing flap. To avoid this difficulty, the surface of the landing flap is provided with a plurality of bosses 11 arranged to register with the openings 10 when the auxiliary flaps are in closed position. This affords a smooth streamlined surface, avoiding the introduction of undesirable drag when the auxiliary flaps are not in use.

To permit the performance of the desired function, the auxiliary flaps 8 are moved simultaneously to operative position in angular relation to the landing flap. This control may be effected in any practicable manner. One practicable adaptation of mechanism permitting simultaneous operation of the flaps is indicated diagrammatically in Fig. 4 in which the auxiliary flaps 8, pivoted at 9 in the structure of the landing flap 6, are provided with arms 12 inwardly directed and connected by links 13 to a piston rod 14 carrying a piston 15 in a cylinder 16. Fluid under pressure may be supplied under control of a suitable valve (not shown) to the cylinder 16 through inlets 17 on opposite sides of the piston 15 to actuate the latter in either direction. Such movement will actuate the auxiliary flaps 8 to the open or closed position as may be desired, and hold them rigidly in the selected position. No attempt is made herein to illustrate or describe the details of the hydraulic actuating mechanism which is commonly employed for similar purposes in the art.

The apparatus as described affords a simple and effective means for accomplishing the desired purpose. When the aircraft is flying under normal conditions, the auxiliary flaps will be closed and ineffective. When braking effect is required, the operator may, by a simple movement, adjust the auxiliary flaps to their operative position at which they become effective for the purpose of the invention. No further attention is required, as the auxiliary flaps perform their function without adjustment. It is, of course, essential that the auxiliary flaps be operated in pairs in order to afford the necessary balance and thus avoid diverting the plane from its intended path under control of the operator.

Various changes may be made in the form, arrangement and construction of the device without departing from the invention or sacrificing the advantages thereof.

We claim:

In aircraft, a movable landing flap having recesses on each side thereof, auxiliary flaps pivotally connected to the landing flap and resting in the recesses, the auxiliary flaps each having a plurality of openings therein, and bosses on the landing flap registering with the openings to afford substantially smooth surfaces when the auxiliary flaps are disposed in the recesses, and means for moving the auxiliary flaps simultaneously from the recesses to positions projecting angularly with relation to the landing flap.

THOMAS KNOX.
WILLIAM I. STIEGLITZ.